June 2, 1931.     W. T. JONES     1,808,556
VALVE
Filed Jan. 26, 1928     2 Sheets-Sheet 1
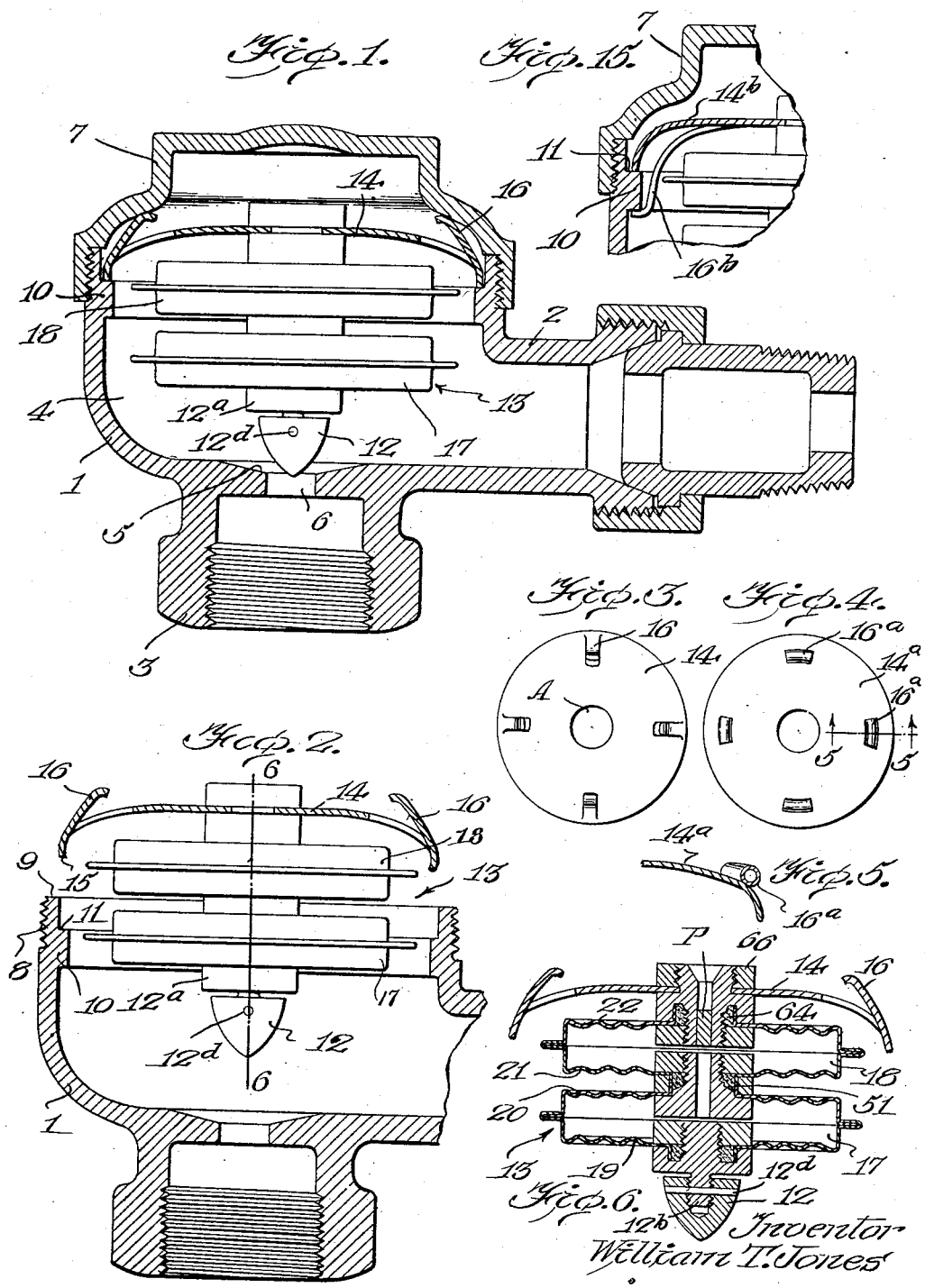

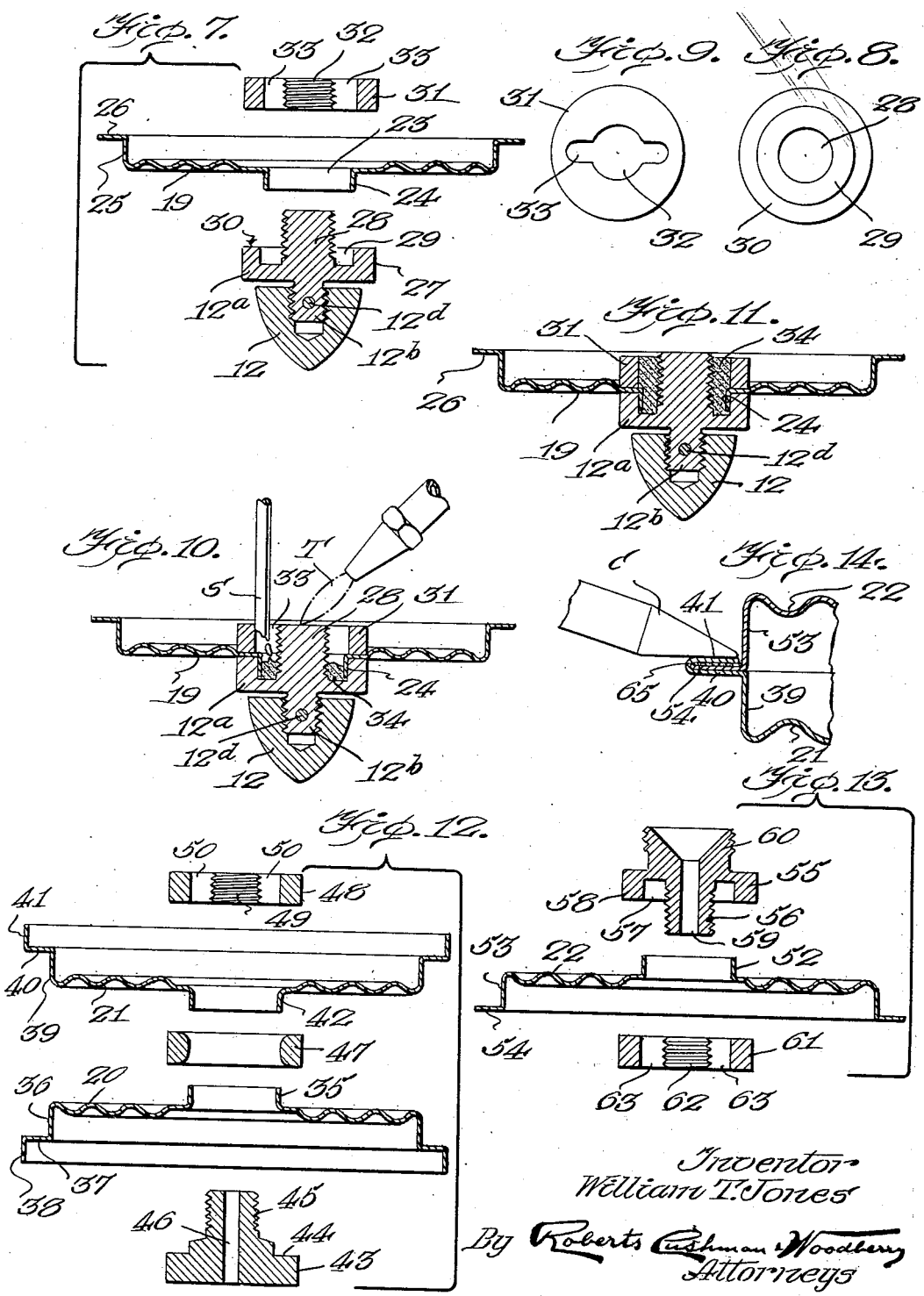

Patented June 2, 1931

1,808,556

UNITED STATES PATENT OFFICE

WILLIAM T. JONES, OF NEWTONVILLE, MASSACHUSETTS, ASSIGNOR, BY MESNE ASSIGNMENTS, TO BARNES & JONES, INC., A CORPORATION OF MASSACHUSETTS

VALVE

Application filed January 26, 1928. Serial No. 249,599.

This invention pertains to automatic valves for controlling pressure fluids and more particularly to a controlling element useful in such a valve. For convenience in disclosure, a trap or outlet valve of the kind used upon steam radiators has been chosen as illustrative of the utility of the invention, but without any intention of restricting the invention, in its broader aspects at least, to this particular environment.

Automatic valves of this type comprise an actuating element responsive to pressure or temperature variations, and this element usually consists of an expansible metallic cell, bellows or the like, to which the valve proper is connected. In order to function properly, the actuating element must be fluid tight and capable of withstanding the conditions of use, for example long exposure to hot steam or moist vapor. These expansible cells usually consist of several parts which are united by means of solder or its equivalent, but most soldering materials deteriorate if exposed for long periods to steam, water or other fluids, showing a tendency to dissolve, become porous, or soften, so that such expansible cells often develop leaks or fall apart.

My new controlling element, comprising one or more expansible metal walled cells is so designed that the parts comprising it are mechanically clamped together or interlocked, and while solder or its equivalent is preferably employed as a packing to insure tight joints, the solder is not exposed to fluids or gases which might dissolve or soften it and is not called upon to hold the parts of the cell together, so that the cell thus constructed may be depended upon to remain leak proof for an indefinite time.

In the accompanying drawings I have illustrated one desirable embodiment of the invention, together with certain steps of a preferred process of making the valve actuating element, but I wish it to be understood that the invention is not necessarily limited to the precise details herein illustrated, either as respects its mechanical embodiment or the specific steps or order of steps of the preferred process, but that various changes in mechanical detail and arrangement and proportion of parts, as well as variations in the process, may be made without departing from the invention.

In the drawings:

Fig. 1 is a vertical section illustrating an outlet or trap valve having the present invention embodied therein;

Fig. 2 is a fragmentary view similar to Fig. 1, showing the valve unit partly removed from the casing;

Fig. 3 is a plan view, to smaller scale, showing a preferred support or carrier for the valve proper and its actuating device;

Fig. 4 is a view similar to Fig. 3 but showing a modified construction;

Fig. 5 is a fragmentary section on the line 5—5 of Fig. 4, but to larger scale;

Fig. 6 is a vertical section, substantially on the line 6—6 of Fig. 2, showing details of construction of the valve, its actuating device and the carrier or support;

Fig. 7 is a composite vertical section showing the valve proper and the lower part of the valve actuating element in disassembled relation;

Fig. 8 is a plan view of the valve proper;

Fig. 9 is a plan view of a clamping nut employed in connecting the valve to the actuating device;

Fig. 10 is a vertical section illustrating one step in the process of assembling the valve with the actuating device;

Fig. 11 is a vertical section illustrating the appearance of the parts at the completion of the step shown in Fig. 10;

Fig. 12 is a composite view showing in vertical section various elements employed in the construction of the valve actuating device and particularly those parts employed in connecting a pair of expansible metallic cells;

Fig. 13 is a composite view showing in vertical section the upper elements of the valve actuating device in disassembled relation;

Fig. 14 is a fragmentary vertical section, to large scale, on a plane radial to one of the actuator cells, illustrating a step in the process of closing such cells; and Fig. 15 is a fragmentary section, similar to Fig. 1 but showing a further modification.

Referring to Figs. 1 to 6 inclusive, the improved valve comprises, as is usual, a casing 1 which may be of cast iron or other suitable material having the inlet connection 2 and the outlet connection 3. The main body of the casing provides a chamber 4 which communicates at all times with the inlet and which is provided with an annular valve seat 5 concentric with a valve port 6 connecting the chamber with the outlet. The casing 1 is provided with a removable cover 7 which is internally screw threaded for engagement with external screw threads 8 on the main body of the casing 1, and this cover is provided with an accurately machined surface adapted to seat in fluid-tight contact upon the upper edge 9 of the main casing. At a point below the plane of the edge 9, the casing is provided on its interior with one or more abutment elements 10 furnishing a seat surface or surfaces 11 disposed in a plane accurately perpendicular to and concentric with the axis of the valve port 6. The abutment 10 may consist, as here shown, of a single annular rib, and in this event the seat surface 11 will be continuous and uninterrupted. However, such annular rib 10 may be replaced by a plurality of separated lugs or other elements; such lugs being furnished with finished upper surfaces which collectively constitute the seat 11.

The valve 12 is properly shaped to cooperate with the valve seat 5 for closing the port 6, and this valve is directly connected to and suspended upon an actuating device 13 which is adapted automatically to open and close the valve in accordance with pressure or temperature changes in the chamber 4. This automatic actuating device 13 is firmly united to a carrier or support 14. The carrier or support preferably consists of a disk of stiff metal or other substance possessing but little resiliency and which is preferably bowed to arch upwardly in a curve of more or less elliptical form so as to increase its stiffness and strength. This carrier disk or plate 14 is preferably of a diameter slightly less than the inside diameter of the upper part of casing 1 so as to drop freely into the casing and is furnished with a smooth lower edge 15 which is adapted to seat upon the seat surface 11 of the casing and thus to support the valve actuating device and the valve. The carrier 14 rests freely upon the seat surface 11 but has no positive connection to the valve casing, so that by removing the cover 7 this carrier 14 with the parts attached thereto may be removed as a unit from the casing simply by lifting it from the seat 11. In order to prevent the carrier 14 from lifting from the seat 11 under any extraordinary conditions of use, to center it in the casing, and to assure its accurate and firm engagement with the seat surface 11 at all times, I prefer to provide the carrier 14 with a plurality of upstanding tabs or ears 16 which may be struck up from the metal by a stamping or similar process. These tabs or ears are symmetrically disposed and by engagement with the inclined inner surface of the cover compel the support to take a central position in the casing. The ears or tabs possess little if any resiliency and are quite stiff, and when the cover 7 is screwed down into place, the edge 15 of the carrier is forced very firmly against the seat 11. Although the ears 16 possess but little resiliency they are preferably yieldable to a slight extent under the pressure of screwing the cover in place so that there may be no uncertainty in the proper seating of the cover against the edge 9 of the casing, thus insuring a fluid-tight joint at this point. The openings formed in striking up these ears provide convenient means for equalizing the pressure above and below the carrier disk.

In place of the ears 16 struck up from the plate 14 I may provide, as indicated in Fig. 4, a carrier plate 14$^a$ having three or more short sections of tubing 16$^a$ soldered to its upper surface. These sections of tubing are adapted to contact with the inner surface of the cover 7, and as the latter is screwed into place these sections of tubing crush slightly, thus yielding sufficiently to permit the cover to be seated firmly in position and at the same time holding the carrier 14$^a$ down against the seat 11. Instead of the several sections of tubing, shown in Fig. 4, it is possible to employ a continuous piece of tubing soldered to the cover, as suggested, or as a separate element, for example a ring, which may be dropped into place on the carrier 14 before the cover is applied. Any other arrangement for holding the carrier 14 down against this seat without interfering with the proper seating of the cover may obviously be substituted for the arrangement suggested. The carrier plate 14 is provided with a central aperture A which receives a part of the valve actuating device to facilitate suspension of the latter upon the carrier.

Preferably the valve actuating device 13 comprises a pair of expansible metallic cells 17 and 18. The cell 17 comprises a cupped bottom member 19 and a cupped top member 20 opposed thereto, thus providing a chamber for the reception of an expansible fluid. The cell 18 likewise comprises a cupped bottom member 21 and a cupped top member 22 opposed thereto to provide a chamber for expansible fluid. The cells 17 and 18 are united, as hereinafter more fully described, and communicate with each other through suitable passages. In accordance with usual practice a small quantity of an expansible or easily volatile fluid, for example alcohol, is placed within the chambers of the actuating device and these chambers are then sealed from the outside, and when this device is subjected to variations in temperature, the expansible or volatile fluid within the cell expands or contracts and thus causes the valve 12 to move axially with respect to the carrier 14.

As an example of the utility of this arrangement it may be assumed that the valve is attached to a steam radiator, the connection from the radiator leading to the inlet 2. Before steam is turned on, the valve 12 occupies the position shown in Fig. 1, the cells 17 and 18 being contracted and thus lifting the valve 12 from its seat 5. The steam is thus free to flow through the radiator, through the connection 2 into the chamber 4, and thence outwardly through the port 6 to the return connection. When the radiator has become heated so that hot steam enters the chamber 4 the expansible fluid within the cells 17 and 18 is warmed and expands, thus expanding the cells and forcing the valve 12 against the seat 5, closing the passage 6. The flow of steam through the radiator is thus temporarily cut off and the valve 12 remains closed until water of condensation has collected in the chamber 4 sufficiently to cool off the cells 17 and 18, whereupon they again contract, opening the valve 12 and allowing the water of condensation and entrapped air to escape, whereupon a fresh quantity of steam enters the radiator.

Since the carrier 14 is substantially rigid, it acts as a solid abutment for the cells 17 and 18 so that the entire expansive effort is exerted in moving the valve 12. The parts 16 or 16ª are so strong that under no circumstances does the carrier 14 lift from the seat 11, as I believe that any such action is undesirable and tends to decrease the accuracy and efficiency of the valve.

While the carrier 14 is here shown as consisting of a disk or plate, I contemplate that it may be formed as a spider, either of sheet material or as a casting as may be preferred; and while I have here shown the actuating device as comprising two cells, I contemplate that a single cell might be useful under some circumstances or that a greater number than two might be found desirable.

The actuating element as here shown and as above described comprises two expansible metal cells 17 and 18 and for convenience, accuracy, and reduction in cost I suspend the valve 12 upon the actuating device. Referring to Fig. 7, the lower wall 19 of the bottom cell 17 consists of a thin metallic annulus, preferably corrugated so that it may have the desired degree of stiffness and resiliency, and while other materials may be employed I prefer to use phosphor-bronze in making the walls of the expansible cells since this material possesses the desired resiliency and resistance to corrosion and the effects of high temperature. Preferably this material is coated or plated with tin on both faces, although this is not essential. The annulus 19 is provided with a central opening 23 defined by a down-turned flange 24, and it is furnished with an upstanding marginal flange 25 whose edge is turned outwardly in a substantially horizontal plane, as shown at 26. The valve proper, indicated at 12, is preferably of more or less acorn shape, since this shape is found to cooperate very well with the valve seat without necessitating guides or packing material. To permit proper adjustment or calibration of the device by the manufacturer, I prefer to make the valve in two parts, the upper part 12ª having a screw-threaded stem 12ᵇ engaging a threaded axial socket in the lower part. After adjustment by the manufacturer, the parts are preferably locked against further relative movement, as for example, by drilling a hole transversely through the lower part 12 and the stem 12ᵇ and inserting a pin 12ᵈ in the hole, smoothing off the ends of the pin flush with the surface of the valve, thus making it difficult for inexperienced persons to tamper with the adjustment. The upper part 12ª of the valve 12 is furnished with the upstanding externally screw-threaded stem 28 which is surrounded by an annular chamber 29 having an outer wall 27 furnished with an accurately smooth upper surface 30. The channel or chamber 29 is of an external diameter such that the flange 24 of the annulus 19 fits snugly against the outer wall of the channel but leaving a space between the stem 28 and the inner surface of the flange 24. A clamping nut 31 having an internally screw-threaded bore 32 is adapted to cooperate with the threaded stem 28, and when associated with the latter to form a rigid hub for the annulus 19. The clamping nut 31 is provided with recesses 33 for a purpose hereafter described.

In assembling the parts shown in Fig. 7, the flange 24 is seated in the channel or chamber 29 and the nut 31 is screwed down on the stem 28 until the central portion of the annulus 19 is clamped firmly between the nut 31 and the surface 30. With the parts thus mechanically clamped the hub portion is then heated as for example by applying the flame T of a blow-torch, as shown in Fig. 10, and when the parts are sufficiently hot a piece of string solder S is introduced through one of the recesses 33. This solder melts and flows into the space between the stem 28 and the flange 24, the other recess providing a vent, forming a body of solder 34 which completely fills the channel and the recesses 33. When this solder solidifies, (see Fig. 11) it prevents the nut from loosening and forms a very efficient packing to prevent leakage between the parts 12ª, 19 and 31, although this solder is not called upon to bear any mechanical strain in holding the parts in assembled relation. The main body of this solder is protected from exposure to steam or vapor either externally or internally, the only portions which are exposed at all being the small areas within the recesses 33, and thus the main body of the solder in the channel 29 is not subject to deterioration from the effects of heated fluids or gases.

The upper wall 20 of the lower cell 17, as indicated in Fig. 12, consists of a metallic annulus similar to the annulus 19, having a central opening defined by the up-turned flange 35. This annulus also has a marginal down-turned flange 36 whose edge portion is turned outwardly at 37 and then again downwardly at 38. The lower wall 21 of the upper cell 18 likewise consists of a metallic annulus having the outer marginal upturned flange 39 which is bent outwardly at 40 and then upwardly again at 41. This annulus has a central opening defined by a down-turned flange 42 of substantially the same diameter as the flange 35.

The parts 20 and 21 are connected by means of a hub comprising the lower member 43 having an annular seat surface 44 and an upwardly extending screw-threaded stem 45. This lower member is also furnished with an axial passage 46. I also provide a spacer ring 47 having substantially plane and parallel upper and lower surfaces and having a central opening of a proper diameter to receive the flanges 35 and 42 of the members 20 and 21, respectively. The stem 45 of the part 43 is substantially smaller in diameter than the openings in the flanges 35 and 42, so that when this stem has passed up through these openings and through the opening in the ring 45, an annular space or chamber surrounds the stem 45. I also provide a locking nut 48, substantially like the nut 31 above described, having the internally screw-threaded bore 49 for engagement with the threaded stem 45 and having the recesses 50. In assembling these parts the flanges 35 and 42 are fitted within the ring 47, the stem 45 is then passed up axially through these several parts, and the nut 48 is screwed down on the stem 45, thus mechanically clamping the parts together. After the parts are thus securely clamped together, the central or hub portion comprising the parts 43, 47 and 48 is heated, and solder is introduced through one of the recesses 50. This solder 51 (Fig. 6) fills the annular clamp surrounding the stem 45 and constitutes a packing to prevent leakage between the parts, although this solder is not essential as a means for holding the parts in assembled relation. It will be noted that in this case also the solder is substantially enclosed between the metal parts so that it is not subject to deterioration through exposure to fluids or gases.

The upper wall member 22 of the cell 18 is furnished with a central opening defined by the upstanding flange 52 (Fig. 13) and has the downwardly directed marginal flange 53 which is turned outwardly at its edge, as shown in 54. I provide a hub member comprising the body part 55 having the downwardly directed screw-threaded stem 56 and the annular recess or chamber 57, whose outer wall 58 is provided with a finished under surface. This member 55 is furnished with an axial passage 59 and has an upwardly extending screw-threaded stem 60. The clamping ring 61, provided with the internally screw-threaded bore 62, is adapted to cooperate with the stem 56. The ring 61 has the recesses 63, and after the parts have been assembled by placing the flange 52 in the channel 57 and screwing the ring 61 onto the stem 56, solder is poured into one of the recesses 53 until the channel 57 is filled.

Having assembled the parts as above described the flange 26 of the lower member 19 is placed in contact with the under surface of the flange 37 of the part 20 and the flange 38 of the latter part is then bent downwardly and inwardly to embrace the flange 26, thus mechanically interlocking the members 19 and 20 to form a complete cell. In order to assure a fluid-tight joint at this point I next prefer to heat the interlocked flanges as for example by passing a hot soldering iron C over them until the tin coating of the opposed surfaces of the metal fuses and coalesces.

After completing the lower cell 17 in this manner, the flange 54 of the upper member 22 is placed in contact with the flange 40 of the part 21 and the flange 41 is then turned over at the flange 54, as shown in Fig. 14. The joint between the interlocked flanges is now made fluid tight by heating, as above described.

Having thus completed the expansible actuating element F pour some expansible liquid, for example alcohol into the interior of the device through the passage 59, preferably partially evacuate the interior of the device, and seal this passage permanently in any suitable manner, as indicated at P, Fig. 6.

The threaded stem 60 is now passed upwardly through the opening A at the center of the carrier plate 14 and a clamping ring 66 is screwed down on the stem 60 and preferably soldered to lock the parts in position. The valve parts 12 and 12$^a$ are now relatively adjusted and locked in adjusted position as above described.

The complete unit thus formed, comprising the carrier plate 14, the expansible device including the two cells 17 and 18, and the valve proper 12, is now ready for use, and by making the several parts of standard thickness and dimensions, as determined by previous experiment, it is possible to make valve actuating units of interchangeable character and which will operate with certainty in response to predetermined temperature or pressure conditions. These interchangeable units may be made in any desired quantity according to standard specifications and may be interchanged for one another at will and with assurance of obtaining proper and accurate operation. Such a unit as above described is simply dropped into the opening at the top of the valve casing and when the cover 7 has been screwed down into place the unit may be depended upon to function in the manner desired, although no provision is made for adjustment either of the valve actuating unit itself (after its adjustment by the maker) or of its position in the casing. The device is thus substantially proof against tampering by inexperienced persons, it may be removed from the casing and replaced by another with the least possible amount of work, it is durable and is not subject to deterioration from the action of hot steam or other hot fluids, and it can be made by a mechanical process which does not comprise expensive or difficult steps.

In Fig. 15 I have illustrated a modified arrangement in which the carrier disk 14$^b$ is provided with spaced downwardly directed legs 16$^b$ having hooks at their lower ends which engage the under surface of the abutment 10, thereby holding the carrier down against the seat surface 11. To facilitate engagement of the hooks with the abutment the latter is provided at suitable intervals with gaps through which the lower ends of the legs 16$^b$ may be passed whereupon a partial rotation of the carrier will move the hooks beneath and into engaging relation to the under surface of the abutment.

While one specific embodiment of the invention has been shown by way of example, and while a desirable process including a certain order of steps has been herein disclosed, I wish it to be understood that the invention is not necessarily limited to the precise details here shown and that the process may be varied both as to the order and number of steps without departing from the spirit of the invention. Moreover, while certain advantages, as above pointed out, are obtained by using the specific means described for supporting the actuating element, I contemplate that the stem 60 of the improved actuating element herein described, might, if desired, be screwed directly into a threaded opening in the cover 7 in accordance with a usual method.

I claim:

1. An actuator element of the class described, said actuator element having an expansible cell comprising at least one flexible metallic annulus and a central hub member, said hub member having parts which clamp the inner portion of the annulus between them, at least one of said hub parts having a chamber in which the edge of the annulus is disposed, and packing material disposed in said chamber to prevent leakage of fluid.

2. An actuator element of the class described, said actuator element having an expansible cell comprising at least one flexible metallic annulus having a flange at its inner edge disposed at an angle to the plane of the annulus, and a hub comprising a part having a screw-threaded stem and an internally threaded part engaging said stem, the part having the stem being provided with a channel concentric with the stem in which the flange of the annulus is seated, the parts of the hub clamping the inner part of the annulus between them, one of the hub parts having a passage leading into said channel, and fusible packing material filling the channel.

3. An actuator element of the class described, said actuator element having an expansible cell provided with opposed spaced flexible metallic walls, each wall being of annular form, the outer edges of the opposed walls being united, a hub at the center of at least one of said walls, said hub comprising opposed parts having screw-threaded engagement with each other, said parts clamping the marginal portion of the annular wall between them, one at least of said opposed clamping parts having an annular channel in the face opposed to the other of said clamping parts, and solder filling said channel.

4. An actuator element of the class described, said actuator element having an expansible cell provided with opposed spaced flexible metallic walls, each wall being of annular form, the outer edges of the opposed walls being united, a hub at the center of at least one of said walls, said hub comprising opposed parts having screw-threaded engagement with each other, said parts clamping the marginal portion of the annular wall between them, one at least of said opposed clamping parts having an annular channel in the face opposed to the other of said clamping parts, the inner edge of the annular wall forming a flange disposed substantially perpendicular to the plane of the wall and fitting within said channel, and packing material filling said channel.

5. A valve actuating cell comprising an annular disk of flexible metal, a hub comprising complemental screw-threaded parts, one at least of said parts having an annular recess therein, the inner edge of the disk being disposed within the recess in said hub part and the inner marginal portion of the disk being clamped between said hub parts, and fusible packing material in said recess.

6. A metallic valve actuating cell comprising an annular disk of flexible metal having its inner edge bent to form a cylindrical flange, a hub comprising complemental parts one of which has an annular recess therein, the flange of the disk fitting into said recess and the inner marginal portion of the disk being clamped between said hub members, and solder filling the recess.

7. An expansible metallic valve actuating cell comprising an annular disk of flexible metal having its inner edge portion bent out of the plane of the disk to form a flange, a hub comprising a part having a screw-threaded stem and an annular recess concentric with the stem and a part having an internally screw-threaded bore adapted to receive said stem, the disk and the stemmed part of the hub being assembled with the flange of the disk fitting into said recess, the second part of the hub being screwed onto said stem, thereby clamping the marginal portion of the disk between the hub parts, and solder filling the recess.

8. An expansible actuator comprising at least two pairs of complemental shallow annular cups of flexible material, an intermediate hub comprising a part having an annular seat surface and a screw-threaded stem, a spacer ring, and a nut member engaging the screw-threaded stem, the inner marginal portion of a cup of one pair being interposed between said annular seat surface and the spacer ring, the marginal portion of a cup of the other pair being disposed between the spacer ring and said nut member, the nut member clamping the several parts together, their end hub members each having complemental screw-threaded parts, the inner marginal portion of the other cup of each pair being clamped between the parts of one of said end hubs respectively, the cups of each pair having interlocking outer edges.

Signed by me at Boston, Massachusetts this 21st day of January, 1928.

WILLIAM T. JONES.